Feb. 3, 1931.  A. W. MALEY ET AL  1,790,826
BRAKING OF ELECTRICALLY PROPELLED RAIL VEHICLES
Filed March 19, 1930   2 Sheets-Sheet 1

INVENTORS
Alfred Walter Maley & Edmund Mackenzie Taunton
BY A. E. Orrell
ATTORNEY.

Patented Feb. 3, 1931

1,790,826

UNITED STATES PATENT OFFICE

ALFRED WALTER MALEY, OF HANDSWORTH, AND EDMUND MACKENZIE TAUNTON, OF BIRMINGHAM, ENGLAND

BRAKING OF ELECTRICALLY-PROPELLED RAIL VEHICLES

Application filed March 19, 1930, Serial No. 437,065, and in Great Britain February 21, 1929.

This invention is a brake system for electrically propelled vehicles, particularly tramcars, which comprises in addition to the usual regenerative or rheostatic electric brake governed by the motor controller, a pneumatic brake operating on the wheels and governed by a separate handle.

The purpose of the invention is to obviate risk of brake failure in emergency by locking of the wheels through simultaneous application of the pneumatic brake and the electric brake. The invention achieves this aim without interfering with the freedom of movement of either the controller handle or the separate handle of the pneumatic brake, so that there is no possibility, as with mechanically interlocked handles, of a motorman preventing with his left hand what he is trying to do with his right.

The invention consists in a pneumatic interconnection of the controller handle with the pneumatic wheel brake, which does not hinder movement of the wheel brake handle but ensures the release of the wheel brake upon the controller handle being moved to electric brake notches.

More specifically the invention consists in the provision of an auxiliary valve operated by the controller handle by which the air brake cylinder is connected or caused to be connected to exhaust.

It is preferred to exhaust the wheel brake expeditiously through an exhaust valve in close proximity to the wheel brake cylinder, and to that end pneumatic means are provided for operating such a valve and are controlled by valves actuated by the controller handle.

Figure 1:
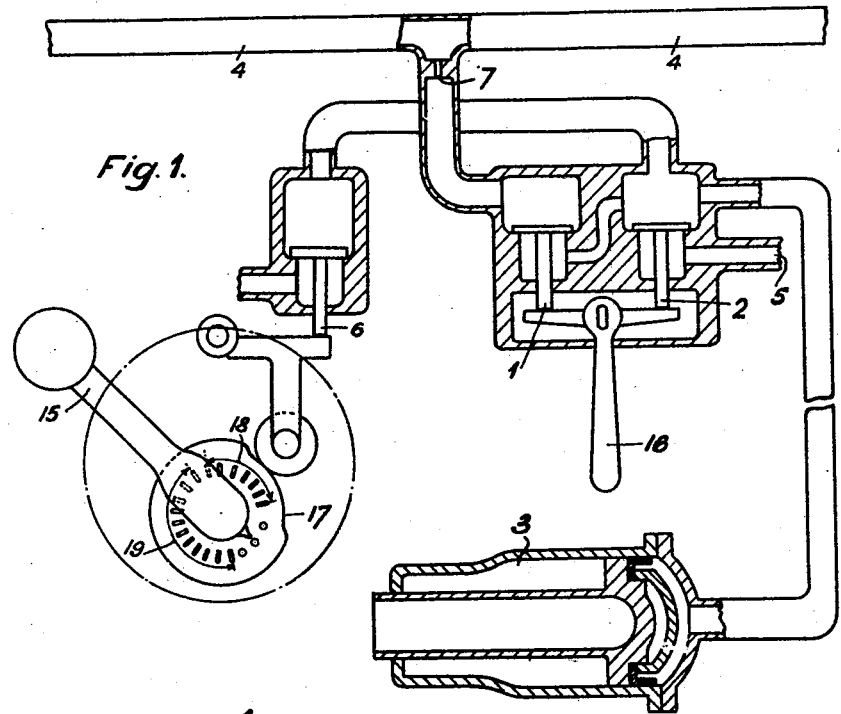
Figure 2:
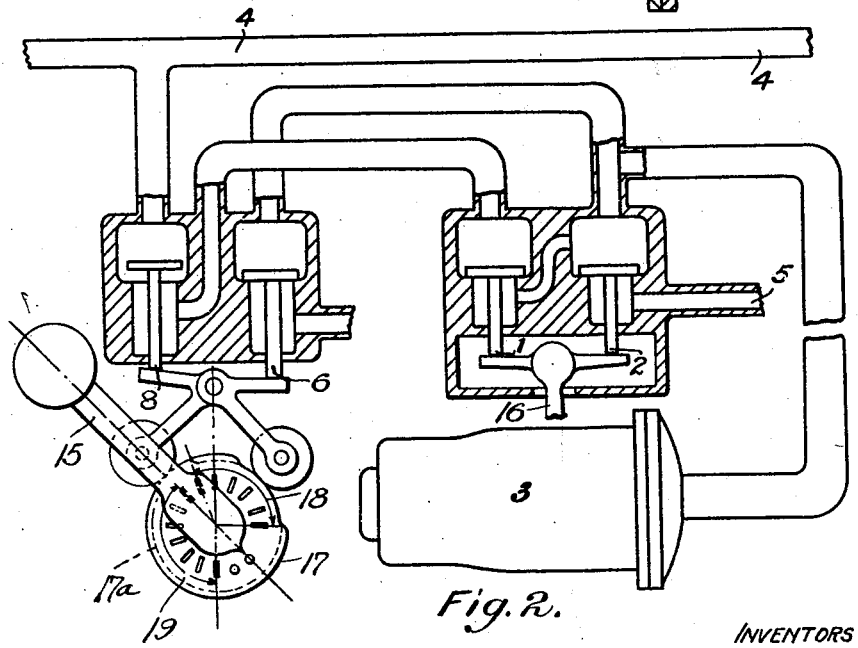
Figure 3:
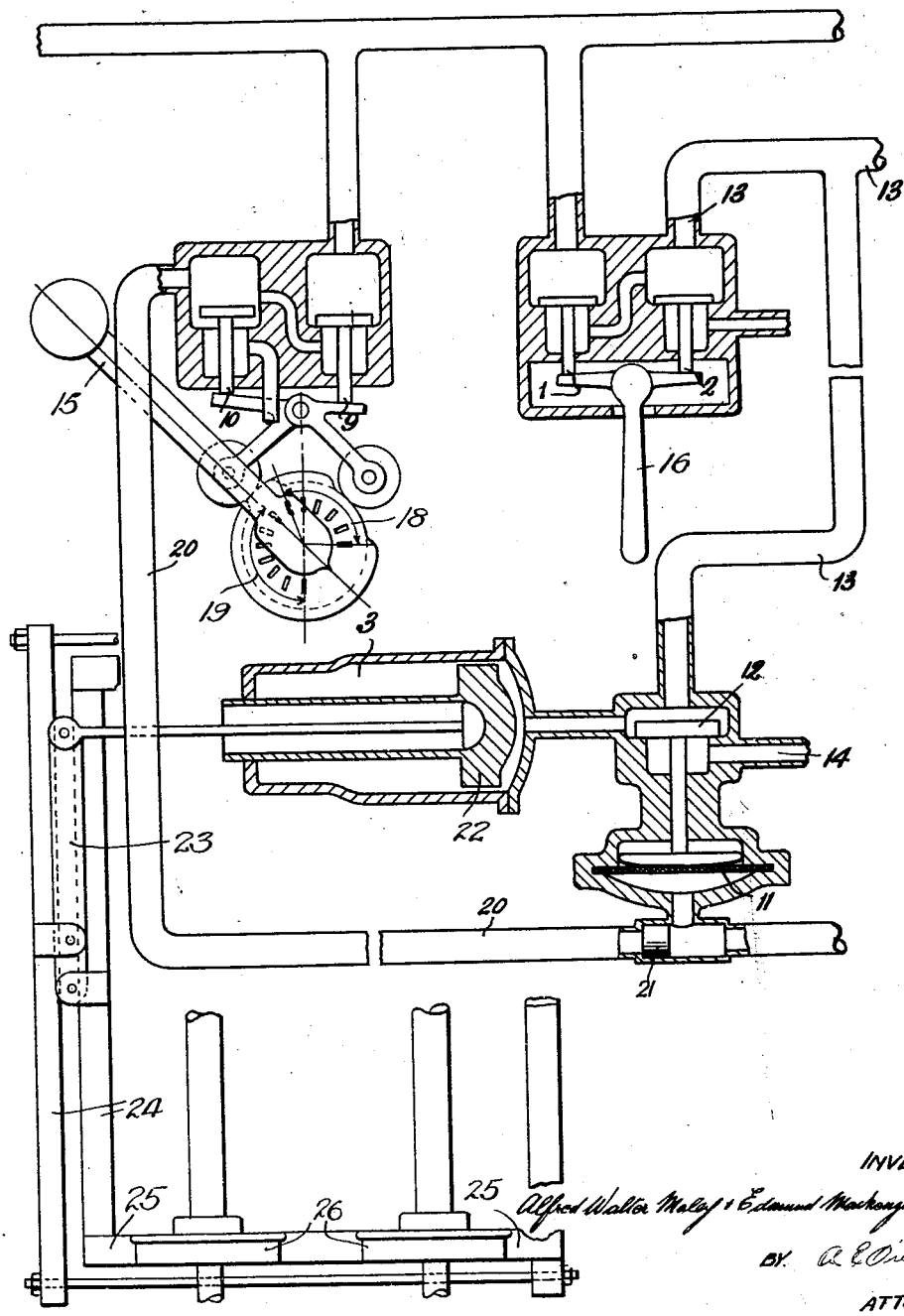

In the accompanying drawings, Figures 1, 2 and 3 are part-sectional side elevations, of somewhat diagrammatic character, of three different forms of the invention, the one represented in Fig. 3 being preferred.

The drawings show the control valves at one end of a car only; the other end is similar. The mechanical details of the brake and the electrical connections of the controller are well known and form no part of the invention. In all cases there is a controller handle 15 which governs the electrical brake in well known manner, and a separate brake handle 16 by which the air brake is normally applied and released in usual fashion. In all the figures 1 and 2 are the admission and exhaust valves, respectively, of the air brake operated by its separate handle 16, the former serving to connect the wheel brake cylinder 3 with the air pressure pipe 4, and the latter to connect the cylinder with exhaust at 5.

For the purpose of the invention the wheel brake has also to be exhausted by the controller handle 15. A separate exhaust valve 6 is shown in Figs. 1 and 2 which is opened by a cam 17 on the controller spindle when the controller is brought to the electrical brake notches 18 or to the power notches 19.

If the driver should make the mistake of holding the air brake handle 16 "on", that will not prevent him operating the electric brake, and in so doing bringing about the release of the wheel brake. But as he would thereby hold the valve 1 open, the simultaneous opening of valve 6 upon the application of the electric brake would cause a direct blow-through from the pressure pipe 4 to exhaust. As, however, it is desirable for the sake of obtaining a gradual application of the air brake, to introduce a permanent constriction 7 into the air supply pipe, the loss of pressure is not exceedingly serious. If there is no such constriction, or it is desired to avoid any unnecessary loss of pressure, the controller spindle may operate, simultaneously with the valve 6, a valve cutting off the brake cylinder 3 from the pipe 4; or the arrangement of Figure 3 may be adopted.

The former proposal is embodied in Figure 2. The controller spindle operates not only the exhaust valve 6 which is in parallel with the exhaust valve 2, but also through cam 17a the admission valve 8 which is in series with the admission valve 1, opening the former and closing the latter when it is turned to electric brake notches.

In the arrangement of Figure 3 there are also admission and exhaust valves, 9 and 10 respectively, operated by the controller spindle, the former being opened and the latter closed when the controller is turned to the electric brake notches. These do not directly govern the air brake cylinder 3, but admit air to or exhaust it from a pneumatically operated valve adjacent the brake cylinder 3. In the drawing a diaphragm valve is shown. The valve 9 when open admits air beneath the diaphragm 11 which, being lifted, shifts the valve 12 from its lower to its upper seat, thereby cutting off the brake cylinder from the train pipe 13 and connecting it to exhaust at 14. This arrangement necessitates an additional pipe 20 but has the advantage of ensuring rapid release of the air brake. It will be understood by those skilled in the art that the brake cylinder 3, though shown for economy of space beneath the valve, will usually be in the middle of the car and at a distance from the controller. Its piston 22 is connected as usual to a lever 23 which, when rocked, separates or brings together the transverse members 24 from which are suspended the brake shoes 25 adapted to bear upon the wheels 26.

The piston 21 prevents a blow-through from the admission valve 10 at one end of the car to the exhaust valve 9 at the other end of the car.

We claim:—

1. In an electrically propelled rail vehicle, the combination of a motor controller and an operating handle therefor, said controller being provided with electrical braking notches, a pneumatic wheel brake, admission and exhaust valves for said brake, a handle separate from the controller handle operating said valves, and an auxiliary means for exhausting said wheel brake operated by the controller handle on reaching the electrical braking notches.

2. In an electrically propelled vehicle, the combination of a motor controller and an operating handle therefor, said controller being provided with electrical, braking notches, a pneumatic wheel brake including a cylinder, admission and exhaust valves for said brake, a handle separate from the controller handle operating said valves, an auxiliary exhaust valve for said wheel brake adjacent said cylinder, and pneumatic means governed by the controller handle for opening said auxiliary exhaust valve upon the controller handle being moved to the electrical braking notches.

3. In an electrically propelled vehicle, the combination, with a pneumatic wheel brake including a cylinder, of admission and exhaust valves at the driver's position controlling said brake, a handle for actuating said valves, a valve adjacent said brake cylinder for cutting off the brake from the pressure supply and connecting it to exhaust, pneumatic means for operating the last-named valve, a motor controller and an operating handle therefor, and auxiliary admission and exhaust valves controlling said pneumatic means and operated by the controller handle.

In testimony whereof we have signed our names to this specification.

ALFRED WALTER MALEY.
EDMUND MACKENZIE TAUNTON.